United States Patent
Sauer et al.

(10) Patent No.: US 11,232,443 B2
(45) Date of Patent: Jan. 25, 2022

(54) SYSTEMS AND METHODS FOR PAYMENT FOR DELIVERY SERVICES

(71) Applicant: Mastercard International Incorporated, Purchase, NY (US)

(72) Inventors: Tara L. Sauer, O'Fallon, MO (US); Christopher T. Scholl, Saint Peter's, MO (US)

(73) Assignee: Mastercard International Incorporated, Purchase, NY (US)

(*) Notice: Subject to any disclaimer, the term of this patent is extended or adjusted under 35 U.S.C. 154(b) by 2 days.

(21) Appl. No.: 16/110,718

(22) Filed: Aug. 23, 2018

(65) Prior Publication Data
US 2020/0065927 A1 Feb. 27, 2020

(51) Int. Cl.
*G06Q 20/40* (2012.01)
*G06Q 20/32* (2012.01)
(Continued)

(52) U.S. Cl.
CPC ......... *G06Q 20/40* (2013.01); *G06Q 20/3274* (2013.01); *G06Q 50/28* (2013.01); *G07F 17/13* (2020.05)

(58) Field of Classification Search
CPC ........ G06Q 20/24; G06Q 20/32; G06Q 20/40; G06Q 20/327; G06Q 20/3274;
(Continued)

(56) References Cited

U.S. PATENT DOCUMENTS 10,789,584 B2 * 9/2020 Pandey ................. G06Q 20/401
2008/0195499 A1 * 8/2008 Meredith ............... G06Q 20/06
705/26.3
(Continued)

FOREIGN PATENT DOCUMENTS

CN 107134071 A * 9/2017
EP 3336459 6/2018
(Continued)

OTHER PUBLICATIONS

T. Chang, "A Secure Cloud-Based Payment Model for M-Commerce," 2013 42nd International Conference on Parallel Processing, 2013, pp. 1082-1086, doi: 10.1109/ICPP.2013.129. (Year: 2013).*
(Continued)

*Primary Examiner* — Bruce I Ebersman
*Assistant Examiner* — Steven R Chism
(74) *Attorney, Agent, or Firm* — Hovey Williams LLP

(57) ABSTRACT

An apparatus and computer-implemented electronic transaction method includes the operation of reading, via a payment-on-delivery device, a machine-readable transaction code in which transaction details of a collect-on-delivery transaction are encoded. A notification is transmitted to a consumer computing device. In addition, the transaction details are transmitted to the consumer computing device. The apparatus transmits payments details for funding the collect-on-delivery transaction to an interchange network for processing the collect-on-delivery transaction. The apparatus receives a payment authorization response message from the interchange network indicating completion of the collect-on-delivery transaction.

10 Claims, 9 Drawing Sheets

(51) Int. Cl.
*G06Q 50/28* (2012.01)
*G07F 17/12* (2006.01)

(58) Field of Classification Search
CPC .... G06Q 20/3276; G06Q 50/28; G06Q 50/30; G07F 17/12; G07F 17/14; A47G 29/14; A47G 29/141; A47G 29/143; A47G 29/145; A47G 29/146
See application file for complete search history.

(56) References Cited

U.S. PATENT DOCUMENTS

| | | | | |
|---|---|---|---|---|
| 2009/0313143 | A1* | 12/2009 | Darensbourg | G06Q 10/087 705/28 |
| 2010/0174647 | A1* | 7/2010 | Kowalchyk | G06Q 20/02 705/44 |
| 2010/0262546 | A1* | 10/2010 | Sahota | G06Q 20/4018 705/75 |
| 2012/0233022 | A1* | 9/2012 | Burk | G06Q 30/06 705/26.41 |
| 2013/0198060 | A1* | 8/2013 | Whitehouse | G06Q 20/22 705/39 |
| 2014/0164230 | A1* | 6/2014 | Klingenberg | G06Q 20/26 705/39 |
| 2014/0379578 | A1* | 12/2014 | Chan | G06Q 20/322 705/44 |
| 2015/0032623 | A1* | 1/2015 | Friedman | G06Q 20/12 705/44 |
| 2015/0120529 | A1* | 4/2015 | Faaborg | G06Q 10/083 705/39 |
| 2016/0247344 | A1* | 8/2016 | Eichenblatt | H04N 7/183 |
| 2017/0140346 | A1* | 5/2017 | Whitehouse | G06Q 20/3829 |
| 2017/0300068 | A1* | 10/2017 | Irwin | G06Q 10/0836 |
| 2018/0070753 | A1* | 3/2018 | Eveloff | H04W 12/08 |
| 2018/0101820 | A1* | 4/2018 | Peynet | G07C 9/00912 |
| 2018/0121873 | A1* | 5/2018 | Walsh | G06Q 10/0836 |

FOREIGN PATENT DOCUMENTS

| | | | |
|---|---|---|---|
| GN | 107134071 | | 9/2017 |
| WO | 2007149762 | | 12/2007 |
| WO | WO-2007149762 A1 | * | 12/2007 |
| WO | 2016013937 | | 1/2016 |
| WO | WO-2016013937 A1 | * | 1/2016 ........... G06Q 10/083 |

OTHER PUBLICATIONS

PCT International Search Report and Written Opinion from PCT Application No. PCT/US2019/044072 entitled Systems and Methods for Payment for Delivery Services (dated Oct. 21, 2019).

* cited by examiner

SYSTEMS AND METHODS FOR PAYMENT FOR DELIVERY SERVICES

FIELD OF THE DISCLOSURE

The field of the disclosure relates generally to electronic financial transactions and, more particularly, to electronic financial transactions completed upon delivery of payment-on-delivery packages when a consumer is not present during delivery.

BACKGROUND OF THE DISCLOSURE

Conventional payment-on-deliver (POD) or collect-on delivery (COD) transactions involve at least a consumer, a merchant, and a third-party delivery service. In some instances, the merchant may be the delivery service, for example, such as frozen food home delivery services. Generally, the third-party delivery service collects payment for the purchased goods and/or services at the time and place of delivery on behalf of the merchant and keeps a portion of the proceeds as payment for making the delivery. COD transactions benefit the consumer, as the consumer is not required to pay for the goods and/or services until the goods and/or service are delivered.

COD transactions are labor intensive and require the third-party delivery service to manually collect and/or process the consumer's payment upon delivery. This is problematic, as the consumer may not be present at the time of delivery. In addition, the merchant has no assurance that the consumer will have the cash on hand or be approved by a respective financial institution to make the purchase at the time of delivery. This contributes to wasted expenditures associated with the packaging and shipping of goods, in addition to relying upon the completion of a manual transaction, which is inherently error-prone by requiring human input of, for example, the price of the goods.

BRIEF DESCRIPTION OF THE DISCLOSURE

This summary is not intended to identify essential features of the present invention and is not intended to be used to limit the scope of the claims. These and other aspects of the present invention are described below in greater detail.

In one aspect, a computer-implemented electronic transaction method is provided. The method includes reading, via a payment-on-delivery device, a machine-readable transaction code in which transaction details of a collect-on-delivery transaction are encoded. The method also includes transmitting a notification, via the payment-on-delivery device, to a consumer computing device, and transmitting the transaction details to the consumer computing device. Furthermore, the method includes transmitting payment details for funding the collect-on-delivery transaction to an interchange network for processing the collect-on-delivery transaction. Moreover, the method includes receiving a payment authorization response message from the interchange network indicating completion of the collect-on-delivery transaction.

In another aspect, a payment-on-delivery device is provided. The payment-on-delivery device includes a photographic element for capturing image data, a motion sensor for detecting the presence of a person, one or more wireless communication modules, and a processor communicatively coupled to the one or more wireless communication modules, the photographic element, and the motion sensor. The processor is specially programmed to read, via the photographic element, a machine-readable transaction code in which transaction details of a collect-on-delivery transaction are encoded. The processor is also programmed to transmit a notification, via the one or more wireless communication modules, to a consumer computing device, and transmit the transaction details to the consumer computing device. Moreover, the processor is programmed to receive, via the one or more wireless communication modules, a payment authorization response message indicating completion of the collect-on-delivery transaction.

BRIEF DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale. Like numbers in the Figures indicate the same or functionally similar components.

DETAILED DESCRIPTION OF THE DISCLOSURE

Figure 1:
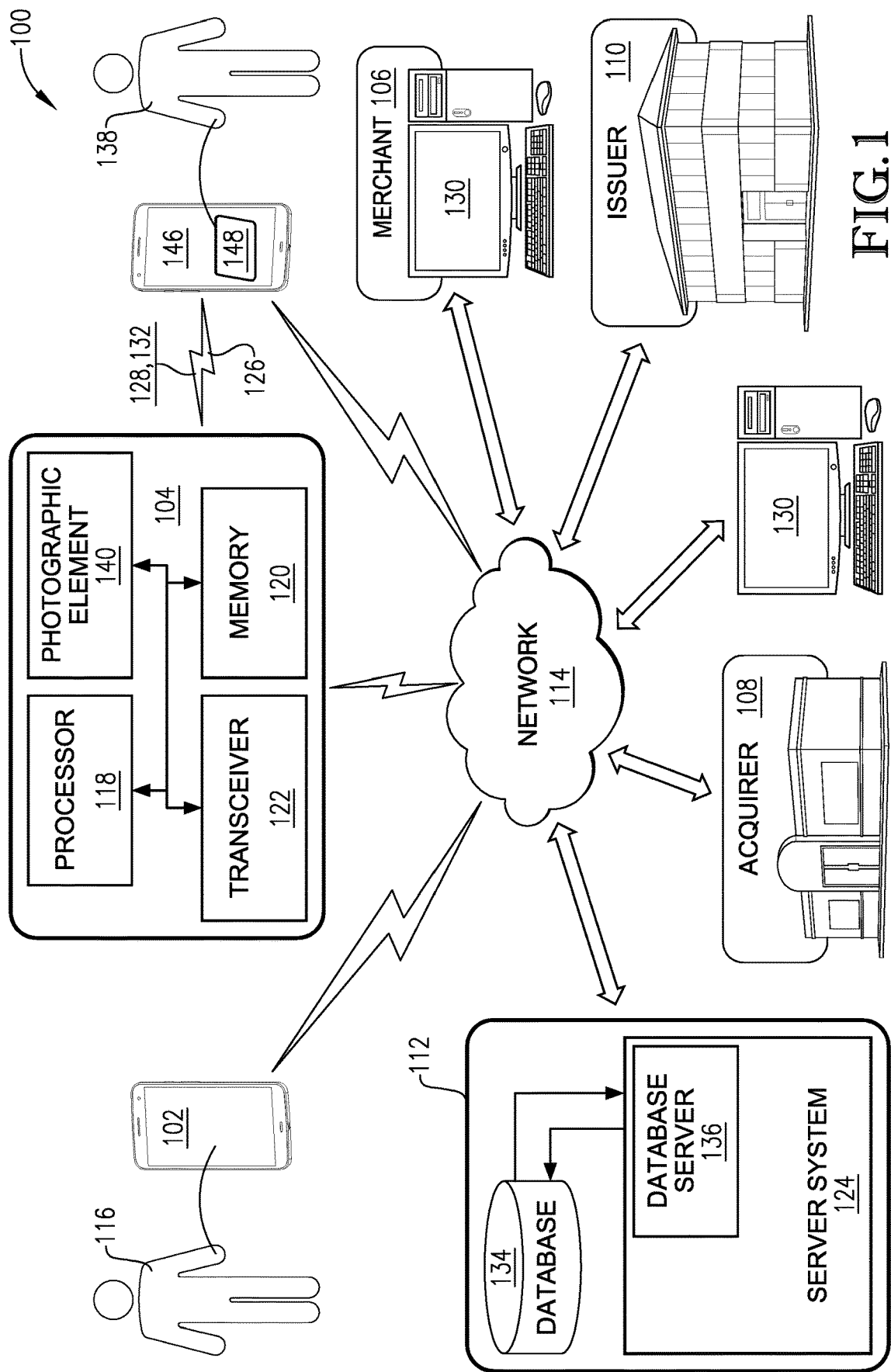
FIG. 1 is a simplified block diagram of an exemplary payment card network system including a consumer payment-on-delivery (POD) device in accordance with one embodiment of the present disclosure.

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

Broadly characterized, the present disclosure relates to systems and methods for completing electronic transactions for payment-on-delivery (POD) or collect-on-delivery (COD) shipments. More particularly, the disclosed embodiments provide a system and computer-implemented method for completing electronic transactions at a consumer's home when the consumer may not be present. In one example embodiment, a consumer payment-on-delivery (POD) device is configured for use with a payment card processing network such as, for example, an interchange network. The consumer POD device broadly includes a camera, motion sensor, and a processor programmed to communicate with a package carrier's mobile device, a consumer's mobile device, and an interchange network to facilitate processing a COD shipment. The consumer POD device reads a machine-readable transaction code in which transaction details of a COD transaction are encoded, transmits a notification to the consumer computing device, and transmits the transaction details to the consumer computing device. In one embodiment, the consumer transmits payment details back to the consumer POD device. The consumer POD device transmits the payment details to the interchange network for processing the COD transaction. The interchange network transmits a payment authorization response message indicating completion of the COD transaction to the consumer POD device. After receiving the payment authorization response message, the consumer POD device transmits a payment completion message to the package carrier mobile device and the consumer computing device. In another embodiment, the consumer computing device transmits payment details to the interchange network for processing the COD transaction. The interchange network transmits a payment authorization response message indicating completion of the COD transaction to the consumer computing device. After receiving the payment authorization response message, the consumer computing device transmits a payment completion message to the consumer POD device.

FIG. 1 is a simplified block diagram of an exemplary payment card network system 100 including a consumer payment-on-delivery (POD) device 104 in accordance with one embodiment of the present disclosure. The payment card network system 100 may be utilized by consumers and merchants as part of a process of initiating an authorization request and performing a transaction concurrent with delivery of goods or services as described herein via an interchange network 112. In addition, the payment card network system 100 is a transaction card account system including a consumer computing device 102, which a consumer 116 may use to conduct electronic transactions and/or record payments for electronic transactions related to purchase of a merchant's goods or services.

The payment card network system 100 enables payment-by-card transactions in which merchants 106, acquirers 108, and/or card issuers 110 do not need to have a one-to-one relationship. The consumer POD device 104 is a specially programmed computing device that connects to the interchange network 112 to facilitate transactions with merchants 106 at the consumer's home, selected delivery location, or wherever the consumer 116 chooses to receive the merchant's goods or services and complete a transaction upon receipt.

In the example embodiment, the payment card network system 100 generally includes the consumer computing device 102, the consumer POD device 104, the merchant 106, the acquirers 108, the issuers 110, and the interchange network 112 coupled in communication via a communications network 114. The network 114 includes, for example and without limitation, one or more of a local area network (LAN), a wide area network (WAN) (e.g., the Internet, etc.), a mobile network, a virtual network, and/or any other suitable public and/or private network capable of facilitating communication among the consumer computing device 102, the consumer POD device 104, the merchants 106, the acquirers 108, the issuers 110, and/or the interchange network 112. In some embodiments, the network 114 may include more than one type of network, such as a private payment transaction network provided by the interchange network 112 to the acquirers 108 and the issuers 110 and, separately, the public Internet, which may facilitate communication between the consumer POD device 104, the interchange network 112, the acquirers 108, and one or more consumer computing devices 102, etc.

Embodiments described herein may relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated. As used herein, financial transaction data includes a unique account number associated with an account holder using a payment card issued by an issuer, purchase data representing a purchase made by the cardholder, including a type of merchant, amount of purchase, date of purchase, and other data, which may be transmitted between any parties of the payment card network system 100.

In a typical transaction card system, a financial institution called the "issuer" issues a transaction card, such as a credit card, to a cardholder or consumer 116, who uses the transaction card to tender payment for a purchase from the merchant 106. The consumer 116 may input information from a transaction card into the consumer computing device 102 and store the information as digital wallet data 306 (broadly, payment credentials) (shown in FIG. 3). The merchant 106 is typically associated with products, for example, and without limitation, goods and/or services, that are offered for sale and are sold to the consumer 116. The merchant 106 includes, for example, a physical location and/or a virtual location such as an Internet-based storefront.

To accept payment from the consumer 116 with, for example, the digital wallet data 306, the merchant 106 must normally establish an account with a financial institution that is part of the payment card network system 100. This financial institution is usually called the "merchant bank," the "acquiring bank," or the acquirer 108. When the consumer 116 submits payment for a purchase with the consumer computing device 102 using the digital wallet data 306, the merchant 106 requests authorization from the acquirer 108 for the purchase. In the exemplary embodiment, the request may be performed using the consumer POD device 104 that reads the consumer's account information from the digital wallet data 306 and communicates electronically with the transaction processing computers of the acquirer 108. Alternatively, the acquirer 108 may authorize a third party to perform transaction processing on its behalf. In this case, the consumer POD device 104 will be configured to communicate with the third party. Such a third party is usually called a "merchant processor," an "acquiring processor," or a "third party processor."

Using the interchange network 112, computers of the acquirer 108 or merchant processor will communicate with computers of the issuer 110 to determine whether the cardholder's account is in good standing and whether the purchase is covered by the cardholder's available credit line. Based on these determinations, the request for authorization will be declined or accepted. If the request is accepted, an authorization code is issued to the merchant 106, for example, via the consumer POD device 104.

When a request for authorization is accepted, the available credit line of the cardholder's account is decreased. Normally, a charge for a payment card transaction is not posted immediately to the cardholder's account because bankcard associations, such as Mastercard International Incorporated, have promulgated rules that do not allow the merchant 106 to charge, or "capture," a transaction until the purchased goods are shipped or the purchased services are delivered. However, with respect to at least some debit card transactions, a charge may be posted at the time of the transaction. When the merchant 106 delivers the purchased products, the merchant 106 captures the transaction, for example, by appropriate data entry procedures on a point-of-sale terminal. This may include bundling of approved transactions daily for standard retail purchases. If the cardholder 116 cancels a transaction before it is captured, a "void" is generated. If the cardholder 116 returns goods after the transaction has been captured, a "credit" is generated. The interchange network 112 and/or the issuer 110 stores the transaction card information, such as, and without limitation, a type of merchant, a merchant identifier, a location where the transaction was completed, an amount of purchase, and a date and time of the transaction, in a transaction database 134.

After a purchase has been made, a clearing process occurs to transfer additional transaction data related to the purchase among the parties to the transaction, such as the acquirer 108, the issuer 110, and the interchange network 112. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 110, the cardholder's account is decreased. Normally, a charge is posted immediately to the cardholder's account. The interchange network 112 transmits the approval to the acquirer 108 for distribution of goods/services or information, or cash in the case of an automated teller machine (ATM).

After a transaction is authorized and cleared, the transaction is settled among the merchant 106, the acquirer 108, and the issuer 110. Settlement refers to the transfer of financial data or funds among the merchant's account, the acquirer 108, and the issuer 110 related to the transaction. Usually, transactions are captured and accumulated into a "batch," which is settled as a group. More specifically, a transaction is typically settled between the issuer 110 and the interchange network 112, and then between the interchange network 112 and the acquirer 108, and then between the acquirer 108 and the merchant 106.

With continued reference to FIG. 1, in the exemplary embodiment, the payment card network system 100 includes a package carrier 138 that has a carrier mobile computing device 146 (e.g., a smartphone or other computing device used by the package carrier to complete transactions) on which a carrier application 148 is installed. The carrier mobile computing device 146 may communicate with the consumer POD device 104 and the network 114, for example, to activate a transaction between the consumer 116 and the merchant 106, and/or receive electronic payment from the consumer 116. The carrier mobile computing device 146 can be any computing device capable of interconnecting to the Internet including a mobile web-based device, smartphone, PDA, or other mobile web-based connectable equipment. In the example embodiment, the carrier mobile computing device 146 is configured to communicate with the consumer POD device 104 to transmit, for example, transaction data to the consumer POD device 104. The carrier mobile computing device 146 is configured to communicate with the consumer POD device 104 using various outputs including, for example, radio frequency communication, near field communication (NFC), network-based communication, and the like.

As shown in FIG. 1, the interchange network 112 includes a server system 124, which is, for example, and without limitation, a server, a network of multiple computing devices, a virtual computing device, or the like. In addition, in some embodiments, the payment card network system 100 may also include one or more merchant or client sub-systems 130 (also referred to as client systems) coupled in communication to the server system 124. The client systems 130 are computers including, for example, a web browser and a memory device, such that the server system 124 is accessible to the client systems 130 using, for example, the Internet. The client systems 130 are interconnected to the Internet through one or more interfaces including a network, such as a local area network (LAN) or a wide area network (WAN), dial-in-connections, cable modems, and special high-speed ISDN lines. The client systems 130 can be any device capable of interconnecting to the Internet including, for example, a web-based smartphone, a personal digital assistant (PDA), or any other web-based connectable equipment.

As described above, the payment card network system 100 includes one or more consumer POD devices 104 that are connected to the server system 124, and in some embodiments, may be connected to the client systems 130. The consumer POD device(s) 104 is interconnected to the Internet through one or more interfaces including a network, such as a local area network (LAN) or a wide area network (WAN), dial-in-connections, cable modems, wireless modems, and special high-speed ISDN lines. The consumer POD device 104 can be any computing device capable of interconnecting to the Internet and including an input device capable of reading information from a user's financial transaction card, including the digital wallet data 306.

Furthermore, as described above, the payment card network system 100 includes at least one consumer computing device 102 (e.g., a smartphone or other computing device used by the consumer to complete transactions), which is configured to communicate with the consumer POD devices 104. In one embodiment, the consumer computing device 102 is associated with or controlled by a user making a purchase using a transaction card account and the payment card network system 100. The consumer computing device 102 may be interconnected to the Internet through one or more interfaces including a network, such as a LAN or a WAN, dial-in-connections, cable modems, wireless connections, and special high-speed ISDN lines. The consumer computing device 102 can be any computing device capable of interconnecting to the Internet including a mobile web-based device, smartphone, PDA, or other mobile web-based connectable equipment. In the example embodiment, the consumer computing device 102 is configured to communicate with the consumer POD device 104 to transmit, for example, the digital wallet data 306 to the consumer POD device 104. The consumer computing device 102 is configured to communicate with the consumer POD device 104 using various outputs including, for example, radio frequency communication, near field communication (NFC), network-based communication, and the like. It is contemplated that in some suitable embodiments, the consumer POD device 104 may be integrated with a consumer computing device 102.

In the example embodiment, the carrier mobile computing device 146 is positioned or located within a predetermined distance of the consumer POD device 104. As used herein, the phrase "predetermined distance" includes a relative distance between two devices that enables communication as defined by the communication technology, for example, radio frequency communication, near field communication (NFC), and the like. The carrier mobile computing device 146 is detected by and communicates with the consumer POD device 104. The consumer POD device 104 may be positioned in various locations that the consumer 116 finds desirable for accepting delivery of products, for example, and without limitation, an entry door or garage door of the consumer's home.

In the example embodiment, the consumer POD device 104 includes a processor 118, a memory 120, a transceiver 122 (broadly, a wireless communication module), and a photographic element 140. In addition, the carrier mobile computing device 146 includes at least a processor 302, a memory device 304, and a transceiver 312 (broadly, a wireless communication module) (each shown in FIG. 3). In the preferred embodiment, when positioned within the predetermined distance, the carrier mobile computing device 146 sends an initial signal wirelessly over a wireless connection 126 to the transceiver 122 of the consumer POD device 104. The initial signal is processed by the processor 118 and a response signal is sent to the transceiver 312 of the carrier mobile computing device 146. The response signal is processed by the processor 302 and stored within the memory device 304.

In another embodiment, the consumer POD device 104 sends the initial signal to the carrier mobile computing device 146 over the wireless connection 126. The initial signal is processed by the processor 302 and a response signal is sent to the consumer POD device 104 over the wireless connection 126. The response signal is processed by the processor 118 and stored within the memory 120.

In one embodiment, the initial signal sent from the carrier mobile computing device 146 to the consumer POD device 104 triggers the consumer POD device 104 to transmit a consumer POD device identifier (ID) 128 to the carrier mobile computing device 146. In addition, a carrier mobile device ID 132 is transmitted by the carrier mobile computing device 146 to the consumer POD device 104. The carrier mobile computing device 146 processes the consumer POD device ID 128 using the processor 302 and transmits it to the server system 124 via the network 114. In another embodiment, the consumer POD device 104 transmits the consumer POD device ID 128 to the client system 130, where it is subsequently transmitted to server system 124 via the network 114. In the example embodiment, the server system 124 is associated with a payment processor of a payment network (shown in FIG. 5).

In the exemplary embodiment, the consumer POD device 104 is configured to receive digital wallet data 306 from the consumer computing device 102 over a network connection to the network 114. As described herein, when a user performs a transaction, digital wallet data 306 is generated. The digital wallet data 306 is transmitted across computer devices as a digital wallet data message. In one embodiment, when the user performs a transaction via the consumer POD device 104, the digital wallet data 306 for the transaction is transmitted to the server system 124 and/or to a client system 130 of the merchant 106, where it is subsequently transmitted to the server system 124, via the network 114. The server system 124 processes the digital wallet data 306 in the manner described herein.

The digital wallet data message may include a transaction amount, a transaction date, account data related to the transaction card used to perform the transaction (e.g., primary account number associated with transaction card, card expiration date, card issuer, card security code, or the like), a merchant identifier, stock-keeping unit (SKU) data relating to the goods or services purchased from the merchant, or the like. In one embodiment, the digital wallet data message also includes location data. As used herein, location data may include address data, city data, state data, zip or postal code data, country data, merchant location identifier data, IP address data, MAC address data, and/or the like. In another embodiment, the digital wallet data message further includes demographic data. This demographic data may correspond to the user's age, place of origin, gender, and the like.

A database server 136 is connected to the transaction database 134. In one embodiment, the transaction database 134 is stored on the server system 124 and can be accessed by users at one of the client systems 130 by logging onto the server system 124 through one of the client systems 130. In an alternative embodiment, the transaction database 134 is stored remotely from the server system 124 and may be non-centralized. The transaction database 134 may store transaction data generated as part of sales activities conducted over the bankcard network including data relating to merchants, account holders or customers, and purchases. The transaction database 134 may also store account data including at least one of a user name, a user address, an account number, and other account identifiers. The transaction database 134 may also store merchant data including a merchant identifier that identifies each merchant registered to use the payment account card network, and instructions for settling transactions including merchant bank account information. The transaction database 134 may also store primary account numbers (PANs) or bank account numbers for various parties including merchants and customers, along with payment verification identifiers and other data necessary to implement the system and processes described herein.

In the example embodiment, the following associations may be made: one of the client systems 130 may be associated with an acquirer, a user, or a consumer; another one of the client systems 130 may be associated with an issuer; the consumer POD device 104 may be associated with a consumer; the consumer computing device 102 may be associated with the consumer; and the server system 124 may be associated with a payment network or interchange network.

In the example embodiment, the server system 124 is associated with a payment network, such as payment network 112, and may be referred to as a payment computer device. The server system 124 may be used for processing transaction data via the payment network. In addition, at least one of the client systems 130 may include a computer system associated with an issuer of a transaction card. Accordingly, the server system 124 and the client systems 130 may be utilized to process transaction data relating to purchases made by a user utilizing a transaction card that is processed by the payment network and issued by the associated issuer. Another client system 130 may be associated with a user or a user seeking to process a transaction with at least one of the payment network, the issuer, or the consumer POD device 104.

The embodiments illustrated and described herein as well as embodiments not specifically described herein but within the scope of aspects of the invention constitute exemplary means for performing financial transactions, and more particularly, constitute exemplary means for performing a financial transaction using a consumer POD device. For example, the server system 124, the consumer POD device 104, the client system 130, the consumer computing device 102, the carrier mobile computing device 146, or any other similar computer device, specially programmed with computer-executable instructions to execute processes and techniques with a processor as described herein, constitutes exemplary means for enabling a user to conduct, manage, and track electronic transactions relating to purchases of a merchant's products using a consumer POD device upon delivery of the purchased products.

The payment card network system 100 described herein is configured to approve "cardless" electronic transactions made using a PAN having the consumer computing device 102 "registered" thereto using, for example, wireless communication, unique user account data, and/or the location (e.g., GPS coordinates) of the computing devices (e.g., the consumer computing device 102 and the consumer POD device 104). The electronic transaction is cardless in that the cardholder does not have to physically handle the transaction card during the electronic transaction. For example, the cardholder 116 receives the transaction card from an issuer 110 and enters registration information into the consumer computing device 102 to register with a payment processing system that enables the consumer computing device 102 to electronically initiate cardless electronic transactions. Registration information includes, for example, and without limitation, transaction card information, contact information (e.g., an email address and/or a telephone number), billing information, and/or shipping information. Transaction card information may include, for example, a transaction card or payment account identifier (e.g., a PAN, a partial account number, and/or a card name), a security code, and/or an expiry date. Shipping information may include, for example, a delivery address and/or delivery instructions. In one embodiment, the cardholder enters, among other data inputs, a PAN into the consumer computing device 102. The PAN is stored in the memory device 304. In another embodiment, the PAN is entered into the consumer computing device 102 but is then sent on to a payment processor computing device where it is tokenized, and the token PAN is returned to the consumer computing device 102 for storage.

Additionally, the cardholder 116 may provide a biometric sample that is to be associated with the other registration information provided that is stored in the consumer computing device 102. Biometric samples include, without limitation, a fingerprint image, a voice recording, a retinal image, facial recognition, palm print image, iris recognition, and the like. The biometric sample is unique to the cardholder 116 and difficult to duplicate and/or forge by an unauthorized user. The biometric sample is stored and associated with a biometric identifier. Additionally, the biometric identifier is associated with the stored registration information and facilitates secure authorization of transactions initiated using any of the registration information. A biometric input device in communication with the consumer computing device 102 may be used for the cardholder to enter the biometric sample. For example, the consumer computing device 102 may include an integral fingerprint or palm reader/scanner, retinal or iris reader/scanner, camera, and/or voice reader/recorder.

Figure 2:
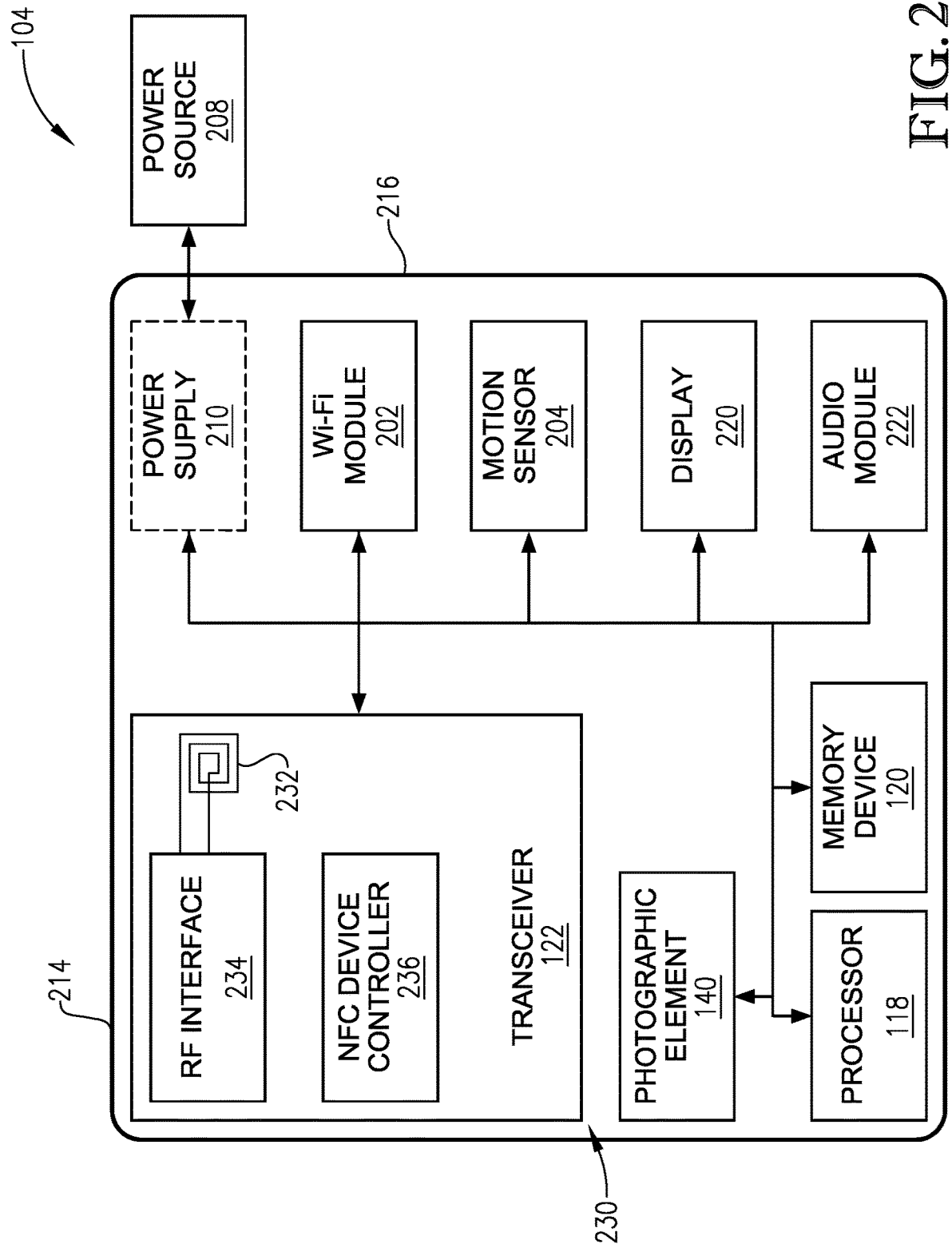
FIG. 2 is a schematic view of the consumer POD device shown in FIG. 1.

FIG. 2 is a schematic view of the consumer POD device 104. In the example embodiment, the consumer POD device 104 is a small form factor computing device configured to connect to the network 114 and mobile computing devices, such as the carrier mobile computing device 146. As described herein, the consumer POD device 104 generally includes the processor 118, the memory 120, the transceiver 122, and the photographic element 140. In addition, the consumer POD device 104 includes an integrated Wi-Fi component 202 (e.g., implementing the Institute of Electrical and Electronics/IEEE 802.11 family of standards), a motion sensor 204, an integrated display 220, and an audio module 222. However, the consumer POD device 104 typically does not include its own power supply; rather, it typically relies upon an external power source 208 to receive power. Alternatively, in some embodiments, the consumer POD device 104 may include an internal power supply 210 (e.g., a battery or other self-contained power source).

The processor 118 includes one or more processing units (e.g., in a multi-core configuration) specially programmed for executing computer readable instructions. The instructions may be executed within a variety of different operating systems (OS) on the consumer POD device 104, such as UNIX, LINUX, Microsoft Windows®, etc. More specifically, the instructions may cause various data manipulations on data stored in the memory 120 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.).

In the example embodiment, the processor 118 may be implemented as one or more cryptographic processors. A cryptographic processor may include, for example, dedicated circuitry and hardware such as one or more cryptographic arithmetic logic units (not shown) that are optimized to perform computational intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the consumer POD device 104 may be widely deployed with various consumers 116, it may be impractical to manually update software for each consumer POD device 104. Therefore, the system 100 provides a mechanism for automatically updating the software on the consumer POD device 104. For example, the updating mechanism may be used to automatically update any number of components and their drivers, both network and non-network components, including system level (OS) software components. In some embodiments, the consumer POD device 104 components are dynamically loadable and unloadable; thus, they may be replaced in operation without having to reboot the OS.

The photographic element 140 may include a camera, as are known in the art, or other optical sensor and lens combinations capable of generating a live video visual feed and taking a picture or capturing an image. In various embodiments, the photographic element 140 may be integrated in the housing or body of the consumer POD device 104. When the photographic element 140 captures a still image or otherwise generates image data (e.g., video data), the photographic element may store image data in a data file, either in raw or compressed format, in the memory 120.

The motion sensor 204 may include one or more sensor elements that detects a person's presence, such as when the package carrier 138 approaches the consumer POD device 104. Upon detection of the presence of a person, the photographic element 140 may begin capturing images (e.g., still or video images) of the person and the audio module 222 may begin capturing audio. The motion sensor may be operatively coupled to the photographic element 140 such that the person's presence may be detected by detecting motion using the photographic element 140. The motion sensor 204 may include, for example, and without limitation, sensor elements such as a passive infrared sensor, an ambient light sensor, and the like.

In the example embodiment, the integrated display 220 can include, for example, and without limitation, a liquid crystal display (LCD), an organic light emitting diode (OLED) display, or an "electronic ink" display. In some embodiments, the display 220 may optionally include a touch controller for support of touch capability. In such embodiments, the consumer POD device 104 may detect a person's presence by detecting that the person has touched the display 220 on the consumer POD device 104.

The audio module 222 may include, for example, and without limitation, a speaker and related components capable of broadcasting streaming and/or recorded audio and may also include a microphone. The microphone facilitates capturing audio through the consumer POD device 104.

In the example embodiment, the consumer POD device 104 includes a housing 214 at least partly (and more preferably, at least substantially or entirely) enclosing the components described above. In addition, the POD device 104 includes circuitry 230 configured to communicate with the carrier mobile computing device 146 (shown in FIG. 1). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the consumer POD device 104. In this embodiment, the circuitry 230 can be made by overmolding the housing 214 onto the circuitry 230 using any known overmolding technique. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 122 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the consumer POD device 104 to function as described herein.

In one embodiment, the transceiver 122 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from, for example, the carrier mobile computing device 146 (shown in FIG. 1) or any other components used in NFC systems. In NFC systems, at least one NFC component generates a magnetic field to inductively transfer currents and, thereby, exchange signals and information with other NFC components positioned within the magnetic field. In the exemplary embodiment, the antenna 232 functions as an NFC component to send and receive signals. The antenna 232 is configured to transmit radio signals to NFC components positioned within the magnetic field of the antenna 232, such as when the carrier mobile computing device 146 is located within a predetermined distance of the consumer POD device 104. Therefore, the magnetic field generated by the antenna 232 defines the active range of the consumer POD device 104. Additionally, the antenna 232 receives radio signals from NFC components when the antenna 232 is positioned within the magnetic field of the NFC components.

The transceiver 122 also includes a radio frequency (RF) interface 234 and an NFC device controller 236. The RF interface 234 and the NFC device controller 236 are powered by the power source 208, and in some embodiments, the power supply 210 or the external display device 220, as is the processor 118 and the memory 120. The RF interface 234 is configured to receive and transmit RF signals through the antenna 232. The NFC device controller 236 is configured to process the received RF signals and to generate signals to be transmitted by the RF interface 234. The memory 120 is configured to store data associated with transmitting and receiving the RF signals. The NFC device controller 236 is coupled in communication with the processor 118.

In some embodiments, the consumer POD device 104 may be connected to one or more peripheral devices (not shown). That is, the consumer POD device 104 may communicate various data with one or more peripheral devices. For example, the consumer POD device 104 may communicate with one or more peripheral devices through the Wi-Fi component 202, the transceiver 122, or other suitable means.

Figure 3:
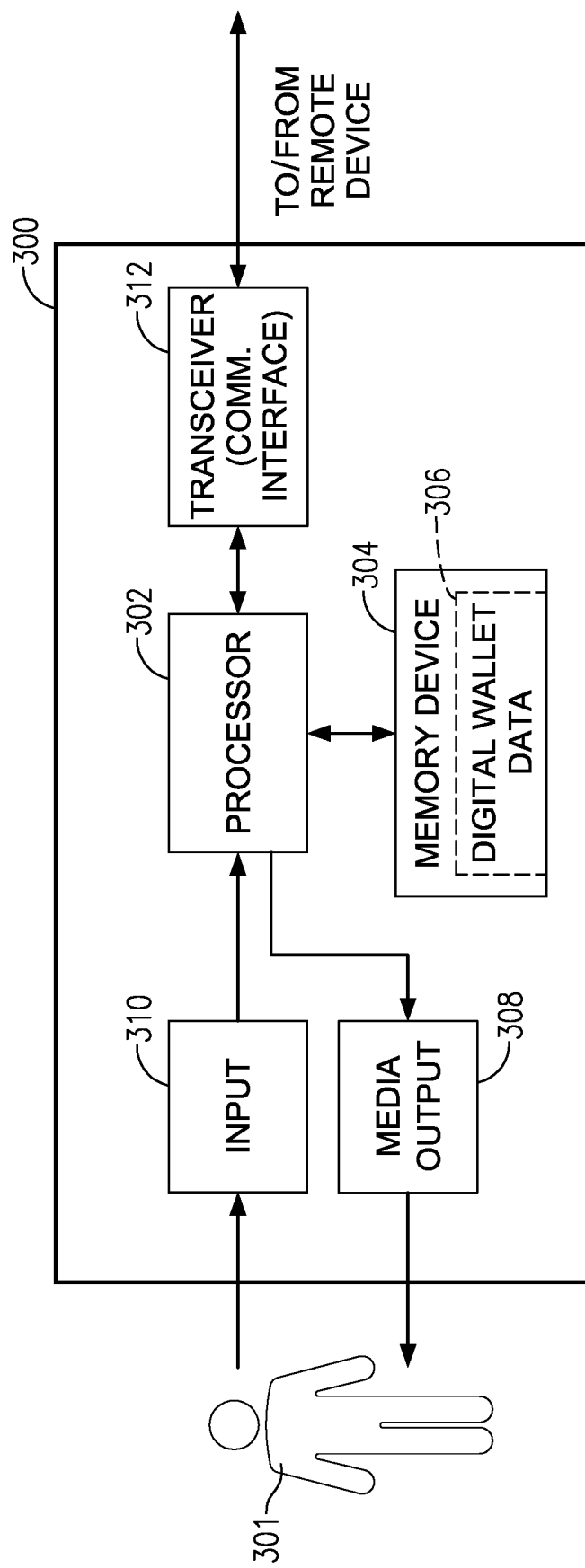
FIG. 3 is an example configuration of a user system for use with the payment card network system shown in FIG. 1.

FIG. 3 is an example configuration of a user system 300 operated by a user 301, such as the consumer 116 or the package carrier 138 (each shown in FIG. 1). In some embodiments, the user system 300 is a consumer computing device 102 (shown in FIG. 1), a client system 130 (shown in FIG. 1), and/or a carrier mobile computing device 146 (shown in FIG. 1).

In the example embodiment, the user system 300 includes one or more processors 302 for executing instructions. In some embodiments, executable instructions are stored in a memory device 304. The processor 302 may include one or more processing units arranged, for example, in a multi-core configuration. The memory device 304 is any device allowing information such as the digital wallet data 306 (optional), executable instructions, and/or written works to be stored and retrieved. The memory device 304 includes one or more computer readable media.

A location of the user system 300 can be obtained through conventional methods, such as a location service (e.g., global positioning system (GPS) service) in the user system 300, "ping" data that includes geotemporal data, from cell location register information held by a telecommunications provider to which the user system 300 is connected, and the like. For example, in one suitable embodiment, a GPS chip can be part of or separate from the processor 302 to enable the location of the user system 300 to be determined.

The user system 300 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the user system 300 includes an input device 310 for receiving input from the user 301. The input device 310 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 308 and the input device 310. The user system 300 may also include a transceiver 312 (broadly, a communication interface), which is communicatively connectable to a remote device such as the consumer POD device 104 (shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and a carrier application 148 (shown in FIG. 1). Web browsers enable users, such as the consumer 116 or package carrier 138, to display and interact with media and other information typically embedded on a web page or a web site from the server system 124. The carrier application 148 allows the package carrier 138 to interact with the consumer POD device 104 to execute a transaction upon delivery of a package to the consumer 116.

Figure 4:
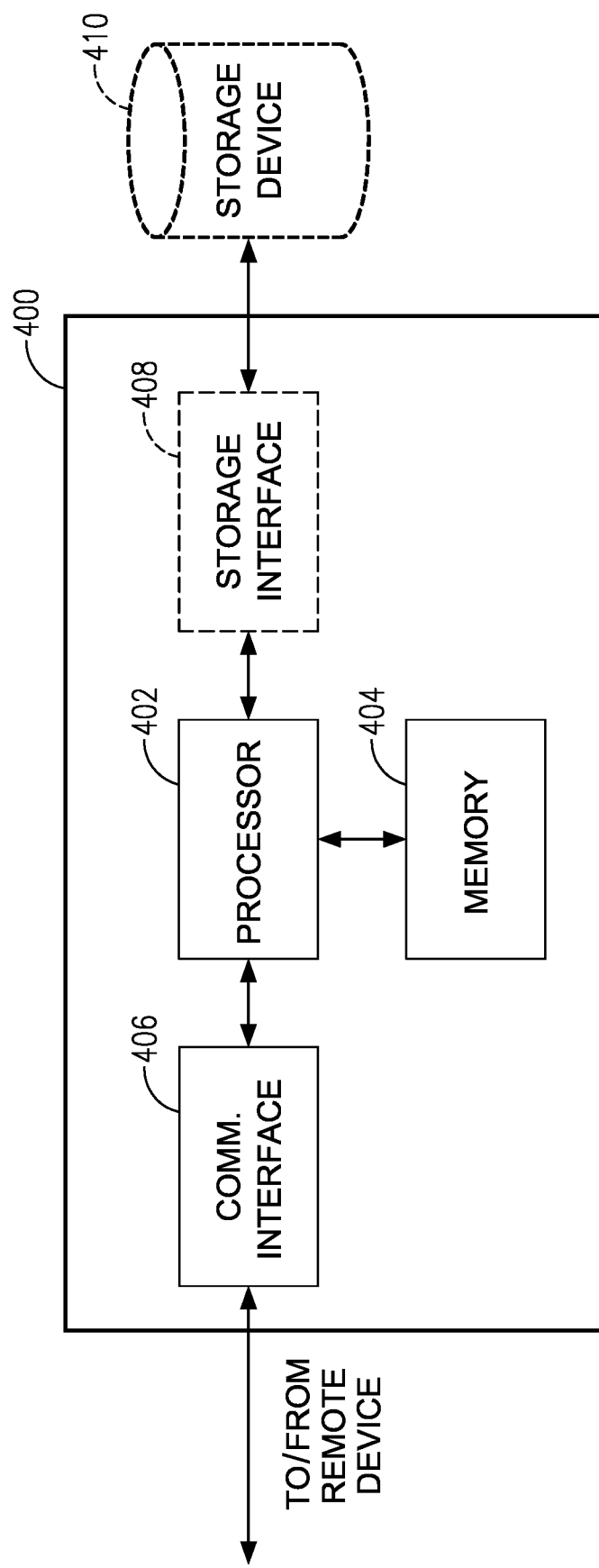
FIG. 4 is an example configuration of a server system for use in the payment card network system shown in FIG. 1.

FIG. 4 is an example configuration of a server system 400, such as the server system 124 (shown in FIG. 1). The server system 400 includes, but is not limited to, the database server 136 (shown in FIG. 1). In some embodiments, the server system 400 is substantially like the server system 124. In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.).

The processor 402 is operatively coupled to a communication interface 406 such that the server system 400 can communicate with a remote device such as a user system 300 or another server system 400. For example, the communication interface 406 may receive communications from the consumer POD device 104 via the Internet, as illustrated in FIG. 1.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is like the transaction database 134 (shown in FIG. 1). For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Figure 5:
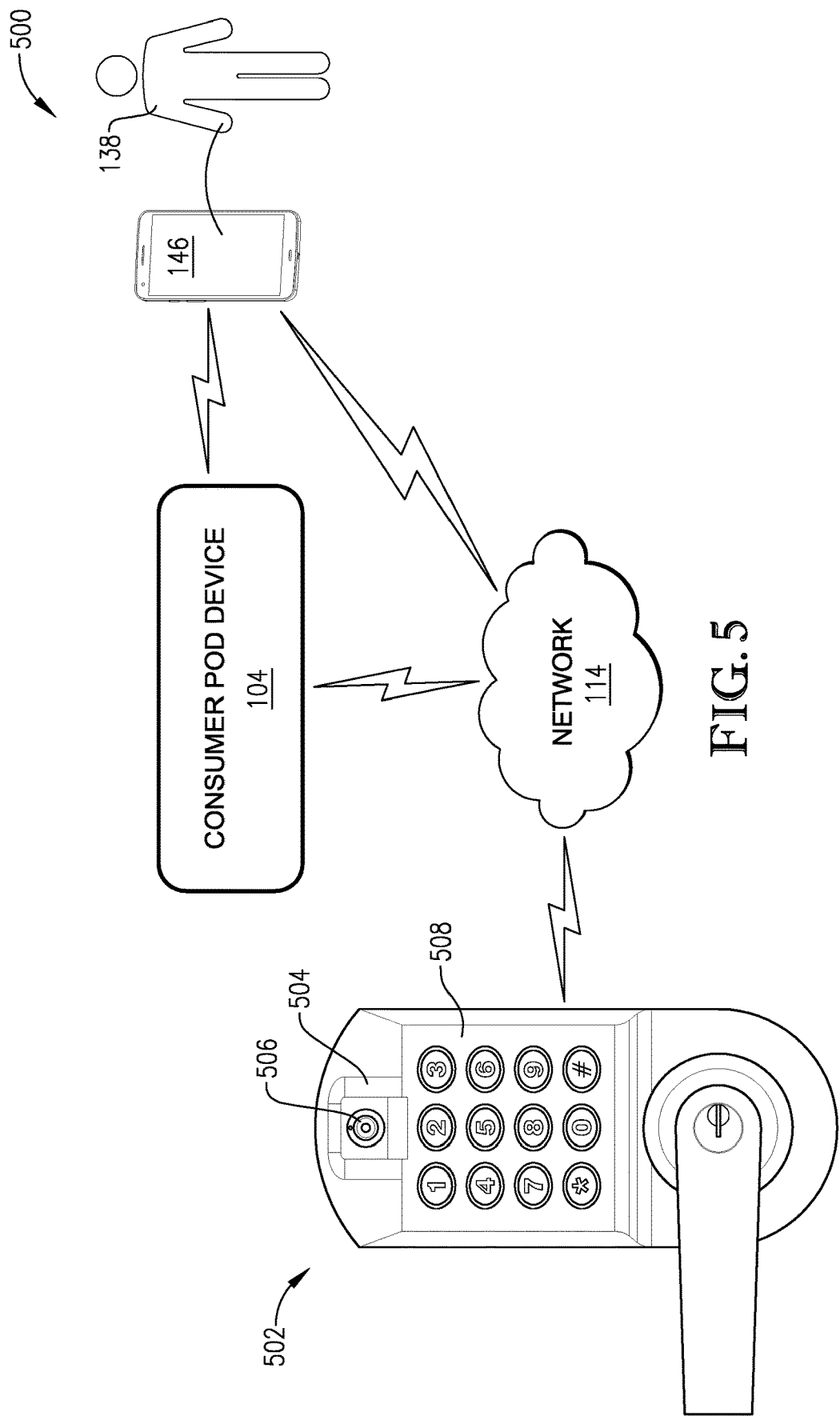
FIG. 5 is a simplified block diagram of an exemplary access system including the consumer POD device of FIG. 1 in accordance with one embodiment of the present disclosure.

FIG. 5 is a simplified block diagram of an exemplary access system 500 including the consumer POD device 104 in accordance with one embodiment of the present disclosure. The access system 500 may be utilized by the package carrier 138 as part of a process of gaining access to the consumer's home, place of business, or other delivery location for delivery of goods or services as described herein.

In the exemplary embodiment, the consumer POD device 104 may be located proximate an access point of the consumer's selected delivery location. The access point may include an electronic lock 502 configured to securely lock the access point, such as a door. As used herein, the phrase "access point" incudes, for example, a door to the interior of the consumer's home or place of business, a storage unit or box associated with the consumer's home or place of business, which can be refrigerated in some embodiments, and/or any other limited access location.

As shown in FIG. 5, the electronic lock 502 may include, for example, and without limitation, one or more of the following: an NFC reader 504; a camera 506 for reading a machine-readable code, such as a barcode or Quick Response (QR) code; and a numeric keypad 508 for entering a numeric code to unlock the electronic lock 502. It is noted that the machine-readable code may consist of a one-dimensional (1D) barcode or a two-dimensional (2D) barcode (e.g., a matrix barcode). A 1D barcode uses a series of variable-width lines and spaces to encode data. A 2D barcode uses patterns of squares, hexagons, dots, and other shapes to encode data. A 2D barcode may include, for example, and without limitation, a QR code or other codes such as a Data Matrix code, a PDF417 code, an EZcode, a high capacity color barcode, a ShotCode, a MaxiCode, and the like.

In an embodiment where the electronic lock 502 includes the NFC reader 504, the electronic lock may be enabled for reading an NFC enabled device, such as the carrier mobile computing device 146, or a passive NFC tag (e.g., a key fob and the like). In operation, the electronic lock communicates inductively with the carrier mobile computing device 146, which responds with a unique identifier, such as a Universal Resource Indicator (URI), which is encoded in such a way as to actuate the electronic lock 502.

In another embodiment, a user, such as the package carrier 138, may provide the machine-readable code, such as a barcode or QR code described above, to the electronic lock 502 within the field of view of the camera 506. An exemplary embodiment of the machine-readable code utilizes a QR code and will be referred to herein as such. The QR code may include, for example, the URI. When the QR code is scanned by the camera 506, the electronic lock 502 may be actuated to enable entry to the access point.

Furthermore, the electronic lock may include the numeric keypad 508. The numeric keypad 508 may be used, for example, by the package carrier 138 to enter a numeric access code by pressing the numbered keys. If the access code is successfully entered, the electronic lock 502 may be actuated to enable entry to the access point.

Figure 6:
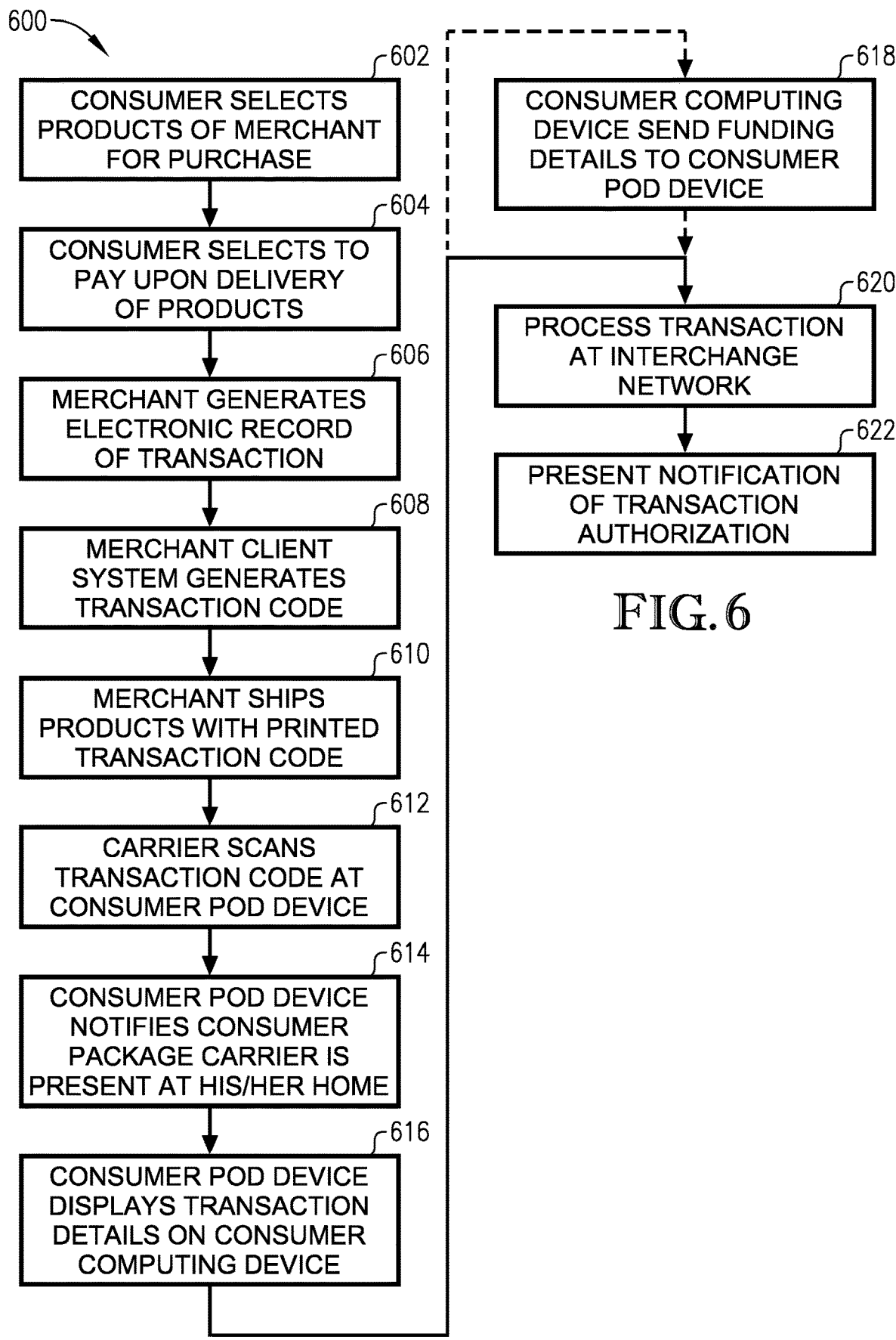
FIG. 6 is a flowchart illustrating an exemplary computer-implemented method for ordering products from a merchant and completing a purchase transaction upon delivery of the products using the consumer POD device shown in FIG. 1.

FIG. 6 is a flowchart illustrating an exemplary computer-implemented method 600 for ordering products from a merchant 106 (shown in FIG. 1) and completing a purchase transaction upon delivery of the products, in accordance with one embodiment of the present disclosure. The operations described herein may be performed in the order shown in FIG. 6 or may be performed in a different order. Furthermore, some operations may be performed concurrently as opposed to sequentially. In addition, some operations may be optional.

The computer-implemented method 600 is described below, for ease of reference, as being executed by exemplary devices and components introduced with the embodiments illustrated in FIGS. 1-5. In one embodiment, the method 600 may be implemented by the payment card network system 100 (shown in FIG. 1). In the exemplary embodiment, the method 600 relates to the receiving of transaction information from the package carrier 138 (shown in FIG. 1) via the consumer POD device 104 (shown in FIG. 1) upon delivery of the products by the package carrier. While operations within the method 600 are described below regarding the consumer POD device 104, the method 600 may be implemented at least partly on the consumer POD device 104 as well as other such devices and/or systems, such as the consumer computing device 102 and/or the carrier mobile computing device 146, through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 602, in the example embodiment, a customer, such as the consumer 116, may visit a merchant 106 (e.g., either a physical location or a virtual location) and select one or more of the merchant's products (e.g., good or services) for delivery. The consumer 116 may select any number of products before proceeding to checkout, where the consumer 116 is prompted to place an order after selecting the products.

At operation 604, during the checkout process, the consumer 116 may select to pay for the products upon delivery (e.g., collect-on-delivery (COD)). Upon selecting to pay for the products upon delivery, the consumer 116 may be presented with the details of the transaction, including, for example, information relating to the consumer, a delivery address, a delivery date or estimated delivery date, and the total payment amount due upon delivery. The details of the transaction may also provide the consumer 116 with a list of all the purchased products.

At operation 606, the merchant 106 may generate an electronic record of the COD transaction. Specifically, the merchant 106 may encode the transaction details in an electronic transaction file stored on, for example, a merchant client system 130 (shown in FIG. 1). The COD transaction may be assigned a transaction number to facilitate identifying and retrieving the transaction details at a future time. Furthermore, at an operation 608, the client system 130 may generate a machine-readable transaction code, such as a barcode or QR code, that may include, for example, the transaction number and other transaction details (e.g., purchased products, quantities of products, etc.). The QR code may be printed and attached to the product package prior to shipment to the consumer 116.

At operation 610, the merchant 106 may ship the purchased products to the consumer 116 as a COD package including the QR code printed on the package. At operation 612, the package carrier 138 arrives at the consumer's home or place of delivery and scans the QR code at the consumer POD device 104. For example, and without limitation, the consumer POD device 104 may detect the presence of the package carrier 138 as described herein. The package carrier 138 may present the QR code to the field of view of the photographic element 140. The consumer POD device 104 may scan the QR code and extract the transaction number and other transaction details.

At operation 614, the consumer POD device 104 may send a notification to the consumer 116 at the consumer computing device 102, for example, via the network 114, notifying the consumer 116 that the package carrier 138 is present at his/her home, place of business, or other consumer selected delivery location. Upon receiving an acknowledgement of the notification from the consumer 116, at operation 616, the consumer POD device 104 may transmit the transaction details to the consumer 116 via the consumer computing device 102, for example, for presentation to the consumer 116 via a display of the consumer computing device 102. The consumer computing device 102 may provide the consumer 116 with an option to select a funding source, such as the digital wallet data 306, for funding the transaction.

Optionally, at operation 618, the consumer computing device 102 may send payment details to the consumer POD device 104, for example, and without limitation, the digital wallet data 306. At operation 620, the digital wallet data 306 may be used, for example, by the consumer POD device 104 or by the consumer computing device 102, to process the transaction (i.e., using the payment details in an approval process to approve or deny the transaction) with the interchange network 112 (shown in FIG. 1).

In an embodiment where the consumer POD device 104 processes the transaction, upon receiving a payment authorization response message indicating completion of the transaction (described below with respect to FIG. 8), at operation 622, the consumer POD device 104 may notify the consumer 116 and the package carrier 138 accordingly. For example, the consumer POD device 104 may transmit a payment completion message to the package carrier 138 for presentation via the display 220 and may transmit the payment completion message to the consumer computing device 102 for presentation to the consumer 116. Alternatively, in an embodiment where the consumer computing device 102 processes the transaction, upon receiving a payment authorization response message indicating completion of the transaction (described below with respect to FIG. 8), the consumer computing device 102 may transmit a payment completion message to the POD device 104 for notifying the package carrier 138 that the transaction was completed. Upon receiving the payment completion message, the package carrier 138 may leave the package at the consumer's home or place of delivery.

As is understood from the above described method 600, the consumer 116 who wishes to make a payment for products upon delivery of the products, can initiate the transaction by having the consumer POD device 104 reading (e.g., scanning) a machine-readable transaction code, such as a QR code, and then proceeding with the transaction using his/her consumer computing device 102. This facilitates the consumer 116 making a payment upon delivery of the products even when the consumer 116 is not at his/her home or other place of delivery.

It is noted that the package carrier 138 and the merchant 106 described above may be one and the same. That is, the merchant may be the package carrier, for example, in instances where the merchant makes home deliveries directly.

Figure 7:
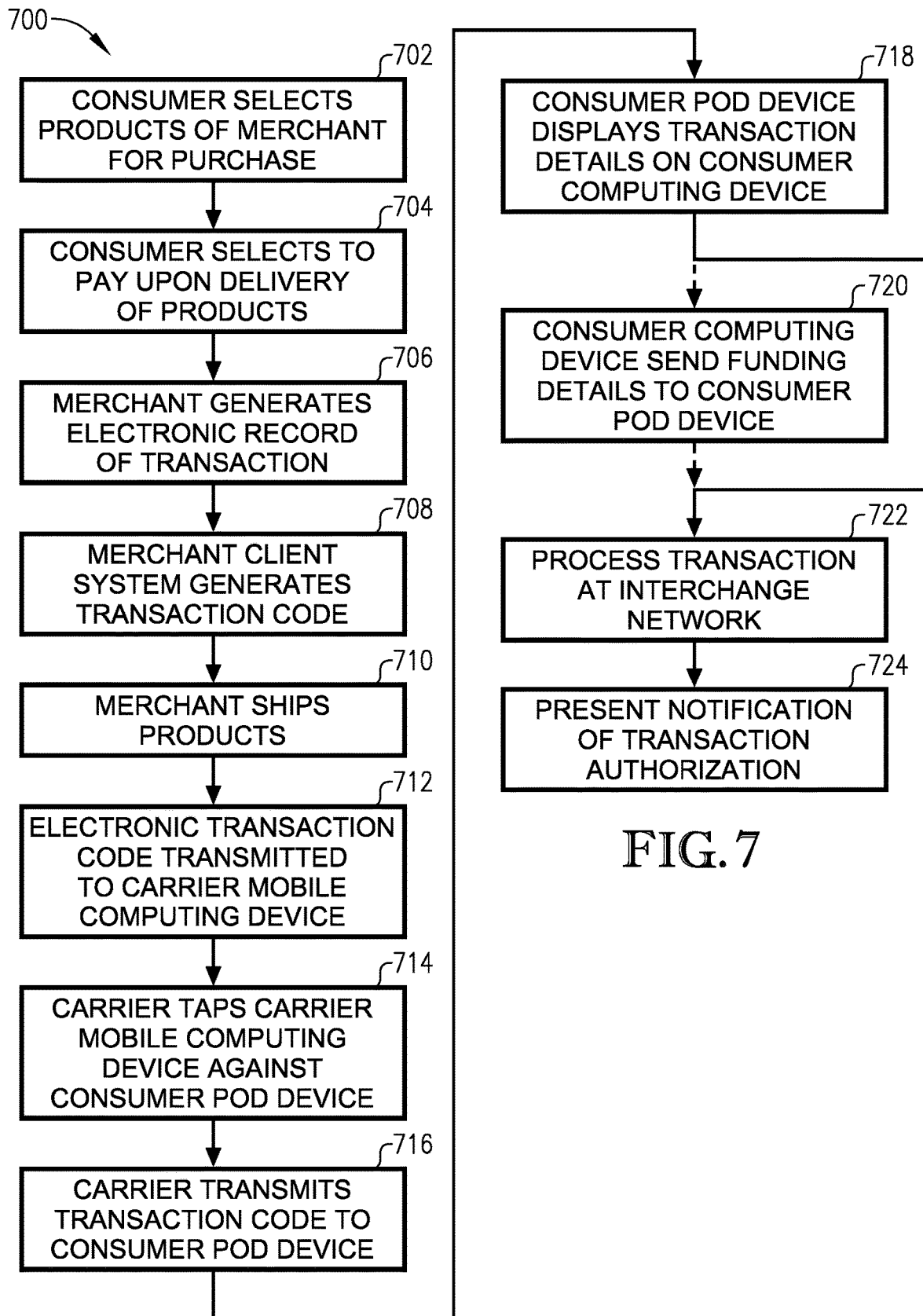
FIG. 7 is a flowchart illustrating an alternative computer-implemented method for ordering products from a merchant and completing a purchase transaction upon delivery of the products using the consumer POD device shown in FIG. 1.

FIG. 7 is a flowchart illustrating an alternative computer-implemented method 700 for ordering products from a merchant 106 (shown in FIG. 1) and completing a purchase transaction upon delivery of the products, in accordance with one embodiment of the present disclosure. The operations described herein may be performed in the order shown in FIG. 7 or may be performed in a different order. Furthermore, some operations may be performed concurrently as opposed to sequentially. In addition, some operations may be optional.

The computer-implemented method 700 is described below, for ease of reference, as being executed by exemplary devices and components introduced with the embodiments illustrated in FIGS. 1-5. In one embodiment, the method 700 may be implemented by the payment card network system 100 (shown in FIG. 1). In the exemplary embodiment, the method 700 relates to the receiving of transaction information from the package carrier 138 (shown in FIG. 1) via the consumer POD device 104 (shown in FIG. 1) upon delivery of the products by the package carrier. While operations within the method 700 are described below regarding the consumer POD device 104, the method 700 may be implemented at least partly on the consumer POD device 104 as well as other such devices and/or systems, such as the consumer computing device 102 and/or carrier mobile computing device 146, through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 702, in the example embodiment, a customer, such as the consumer 116, may visit a merchant 106 (e.g., either a physical location or a virtual location) and select one or more of the merchant's products (e.g., good or services) for delivery. The consumer 116 may select any number of products before proceeding to checkout, where the consumer 116 is prompted to place an order after selecting the products.

At operation 704, during the checkout process, the consumer 116 may select to pay for the products upon delivery (e.g., collect-on-delivery (COD)). Upon selecting to pay for the products upon delivery, the consumer 116 may be presented with the details of the transaction, including, for example, information relating to the consumer, a delivery address, a delivery date or estimated delivery date, and the total payment amount due upon delivery. The details of the transaction may also provide the consumer 116 with a list of all the purchased products.

At operation 706, the merchant 106 may generate an electronic record of the COD transaction. Specifically, the merchant 106 may store the transaction details in an electronic transaction file stored on, for example, a merchant client system 130 (shown in FIG. 1). The transaction may be assigned a transaction number to facilitate identifying and retrieving the transaction details at a future time. Furthermore, at an operation 708, the client system 130 may generate a machine-readable transaction code, such as a QR code, that may include, for example, the transaction number and other transaction details (e.g., purchased products, quantities of products, etc.).

At operation 710, the merchant 106 may ship the purchased products to the consumer 116 as a COD package. As part of the COD shipment, the merchant 106 may electronically transmit the QR code to the package carrier 138 for use with the carrier application 148 installed on the carrier mobile computing device 146, as indicated at operation 712.

At operation 714, the package carrier 138 arrives at the consumer's home or place of delivery and may tap the carrier mobile computing device 146 against the consumer POD device 104. At operation 716, the package carrier transmits the QR code to the consumer POD device 104, for example, by displaying the QR code on the carrier mobile computing device 146 such that the consumer POD device 104 may scan the QR code. Alternatively, the QR code provided to the package carrier by the merchant 106 may be encoded for electronic transmission by NFC communication via the tapping of the carrier mobile computing device 146 against the consumer POD device 104. The consumer POD device 104 may scan or otherwise receive the QR code and extract the transaction number and other transaction details.

At operation 718, the consumer POD device 104 may send a notification to the consumer 116, for example, via the network 114, notifying the consumer 116 that the package carrier 138 is present at his/her home. Upon acknowledgement of the notification, the consumer POD device 104 may display the transaction details to the consumer 116 via the consumer computing device 102.

The consumer computing device 102 may provide the consumer 116 with the option to select a funding source, such as the digital wallet data 306, and optionally, at operation 720, may send the payment details to the consumer POD device 104. At operation 722, the digital wallet data 306 may be used, for example, by the consumer POD device 104 or by the consumer computing device 102, in an approval process to approve or deny the transaction. At operation 724, the consumer 116 and the package carrier 138 may be notified accordingly. For example, the consumer POD device 104 may display an authorization message (described below) to the package carrier 138 via the display 220 and may send an authorization message to the consumer computing device 102. Alternatively, the consumer computing device 102 may transmit an authorization message to the POD device 104 for notifying the package carrier 138 that the transaction was completed. Upon receiving the authorization message, the package carrier 138 may leave the package at the consumer's home or place of delivery.

As is understood from the above described method 700, the consumer 116 who wishes to make a payment for products upon delivery of the products, can initiate the transaction by having the consumer POD device 104 reading (e.g., scanning) or otherwise receiving a machine-readable transaction code, such as a QR code, and then proceeding with the transaction using his/her consumer computing device 102. The method 700 thus facilitates the consumer 116 making a payment upon delivery of the products even when the consumer 116 is not at his/her home or other place of delivery.

It is noted that the package carrier 138 and the merchant 106 described above may be one and the same. That is, the merchant may be the package carrier, for example, in instances where the merchant makes home deliveries directly.

Figure 8:
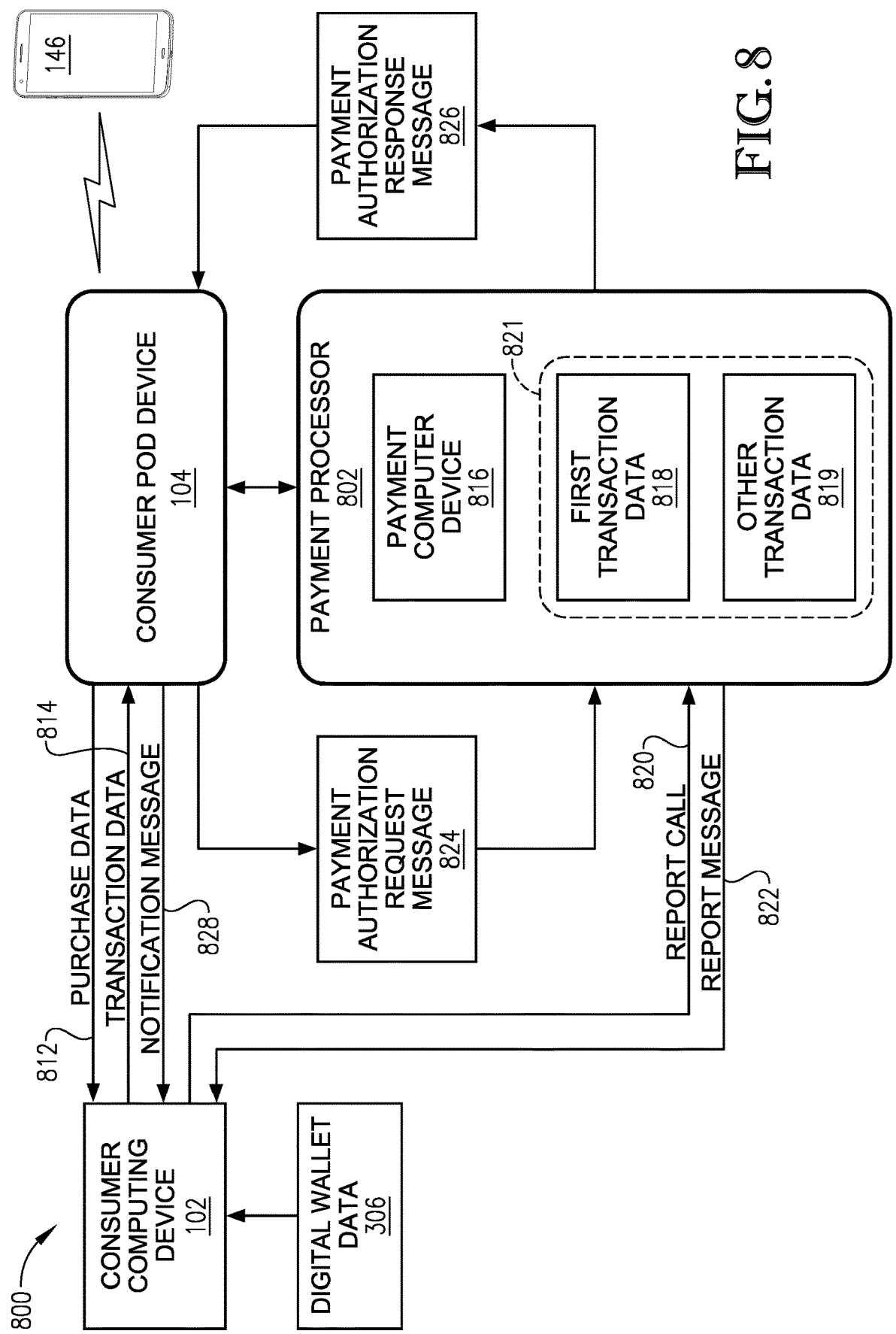
FIG. 8 is a block diagram of a transaction card account system showing data flow among the consumer computing device, the consumer POD device, and a merchant processor of the payment card network system shown in FIG. 1.

FIG. 8 is a block diagram of a transaction card account system 800 showing data flow among the consumer computing device 102, the consumer POD device 104, and a merchant processor 804. In the example embodiment, the system 800 is a transaction card account system such as the payment card network system 100 (shown in FIG. 1). In some embodiments, the payment processor 802 is an interchange network, such as the interchange network 112 (shown in FIG. 1). The consumer computing device 102 is configured to allow consumer 116 (shown in FIG. 1) to access the payment processor 802 via the consumer POD device 104, and electronically transact with the payment processor 802 and/or the consumer POD device 104 to complete the purchase goods or services associated with the merchant 106 (shown in FIG. 1) upon delivery of the goods or services. In the example embodiment, the consumer computing device 102 is coupled in communication with the consumer POD device 104, for example, via the network 114 (shown in FIG. 1).

In the example embodiment, the consumer POD device 104 wirelessly communicates purchase data 812 to the consumer computing device 102. The consumer POD device 104 is configured to transmit the purchase data 812 by radio transmission using the circuitry 230 (shown in FIG. 2), such as the NFC-enabled circuitry or Wi-Fi enabled circuitry. The purchase data 812 includes information related to a transaction for goods and/or services provided by the merchant 106, for example, via the carrier mobile computing device 146.

The consumer computing device 102 transmits the transaction data 814 to the consumer POD device 104 after receiving the purchase data 812 from the consumer POD device 104. The consumer computing device 102 is configured to transmit the transaction data 814 wirelessly via the transceiver 312 (shown in FIG. 3) to the consumer POD device 104. The transaction data 814 includes transaction information responsive to the purchase data 812, i.e., the transaction data 814 indicates a purchased item identifier associated with the goods and/or services the consumer 116 purchased from the merchant for delivery and a payment credential (i.e., the digital wallet data 306).

The consumer POD device 104 receives the transaction data 814 and generates a payment authorization request message 824. The payment authorization request message 824 is transmitted to the payment computer device 816 for processing and further transmission to an issuing bank, such as the issuer 110 (shown in FIG. 1), for approval. In one embodiment, the payment computer device 816 includes an interchange computer associated with an interchange. A payment authorization response message 826 is received from the issuing bank and transmitted to the consumer POD device 104 by the payment computer device 816. Additionally, first transaction data 818 are stored at the payment processor 802 after the transaction is processed by the issuing bank. The first transaction data 818 includes at least the digital wallet data 306 associated with the consumer 116 and the transaction data 814 associated with the purchased item.

After completion of the transaction, the consumer POD device 104 generates and transmits a notification message 828 to the consumer computing device 102 indicating that the transaction was completed and that the purchased goods and/or services will be delivered to the consumer 116 (e.g., left at the consumer's home or place of delivery) associated with consumer computing device 102.

In the example embodiment, the payment computer device 816 is configured to store and/or track other transaction data 819 associated with other purchased items related to consumer computing device 102. The first transaction data 818 and other transaction data 819 define a total transaction data 821 associated with the consumer computing device 102. Moreover, the payment computer device 816 is configured to track, categorize, organize, and/or analyze the first transaction data 818 and/or the total transaction data 821. In one embodiment, the payment computer device 816 is configured to aggregate a monetary value of the stored first transaction data 818 and/or the total transaction data 821 over a period of time.

The consumer computing device 102 is configured to allow the consumer 116 to remotely access the consumer POD device 104 and the payment computer device 816, and electronically transact with the consumer POD device 104 and/or the payment computer device 816. In the example embodiment, the consumer computing device 102 is configured to conduct electronic transactions associated with the first transaction data 818 such as, financial transactions, and to present the transactions to the consumer 116. The consumer computing device 102 is also configured to transmit a report call 820 to the payment processor 802 to request a report message 822, which includes a record of the stored transaction data 818 and/or the total transaction data 821 including financial transactions.

The payment computer device 816 stores the first transaction data 818 and/or the total transaction data 821, the digital wallet data 306, and the transaction data 814 for the consumer computing device 102. The consumer 116 may view the transaction data 818 and 821 by transmitting the report call 820 to the payment computer device 816, receiving the report message 822, and displaying the report message 822 using the media output component 308 (shown in FIG. 3) of the consumer computing device 102. More particularly, the payment computer device 816 is configured to transmit the report message 822 including the first transaction data 818 and/or the total transaction data 821 to the consumer computing device 102. The consumer computing device 102 is configured to receive the report message 822 including the first transaction data 818 and/or the total transaction data 821 from the payment computer device 816 for display to the consumer 116.

Figure 9:
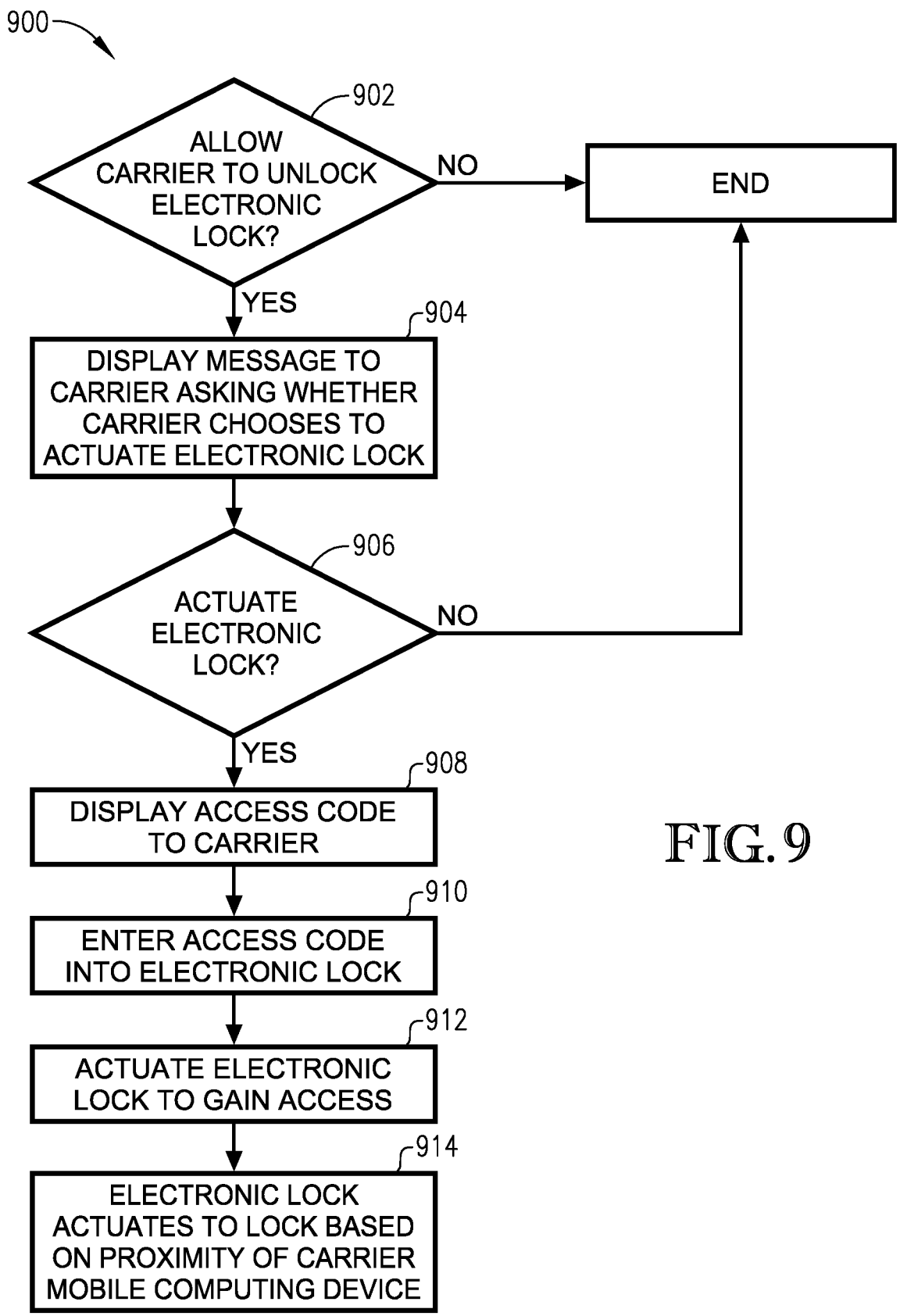
FIG. 9 is a flowchart illustrating a computer-implemented method for unlocking an electronic lock of the access system shown in FIG. 5, after completing a purchase transaction for receipt of a payment-on-delivery package.

FIG. 9 is a flowchart illustrating a computer-implemented method 900 for unlocking an electronic lock (shown in FIG. 5) after completing a purchase transaction for receipt of a payment-on-delivery package, in accordance with one embodiment of the present disclosure. The operations described herein may be performed in the order shown in FIG. 9 or may be performed in a different order. Furthermore, some operations may be performed concurrently as opposed to sequentially. In addition, some operations may be optional.

The computer-implemented method 900 is described below, for ease of reference, as being executed by exemplary devices and components introduced with the embodiments illustrated in FIGS. 1-5 and 8. The method 900 may be implemented by the access system 500 (shown in FIG. 5). In the exemplary embodiment, the method 900 relates to the receiving of access data from the consumer computing device 102 (shown in FIG. 1) via the consumer POD device 104 (shown in FIG. 5) upon authorization of the payment transaction for a payment-on-delivery package.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

As discussed above with respect to methods 600 and 700, after the consumer 116 has completed the payment transaction to receive the purchased products from the merchant, at operation 902, the consumer POD device 104 may display a message at the consumer computing device 102 requesting whether the consumer 116 wishes to allow entry to the consumer's selected delivery location (e.g., home, place of business, storage unit, etc.) by unlocking the electronic lock 502 (shown in FIG. 5). For example, in some embodiments, the consumer POD device may transmit a push notification to the consumer computing device 102 that automatically displays a pop-up message on the consumer computing device display. Alternatively, the consumer 116 may provide a notification to the consumer POD device 104 during the transaction that the electronic lock 502 may be actuated by the package carrier 138 upon completion of the payment transaction. If the consumer 116 chooses not to allow entry, the method 900 ends. If the consumer chooses to allow entry, the method 900 continues as described herein at operation 904.

At operation 904, if the consumer chose to allow the package carrier to actuate the electronic lock 502, the consumer POD device 104 may display a message to the package carrier 138 asking whether the package carrier 138 wishes to actuate the electronic lock 502 to enable the package carrier 138 to leave the package inside the access point, i.e., the consumer's home or other selected delivery location. The message may be displayed to the package carrier 138 via the display 220 of the consumer POD device 104, or alternatively, via the carrier application 148 of the carrier mobile computing device 146. As discussed above, the consumer POD device 104 may establish a wireless connection with the carrier mobile computing device 146 to facilitate displaying the message within the carrier application 148.

At operation 906, the package carrier 138 may select not to actuate the electronic lock 502, thereby ending the interaction with the consumer POD device 104. At this point, the package carrier may leave the consumer's selected delivery location (e.g., home, place of business, storage unit, etc.). Alternatively, the package carrier 138 may select to actuate the electronic lock 502.

Upon selecting to actuate the electronic lock 502, the consumer POD device 104 may display an access code to the package carrier 138 for actuating the electronic lock 502 at operation 908. The access code, for example, may be a one-time use access code that expires upon unlocking of the electronic lock 502. The consumer POD device 104 may display a QR code on the display 220 of the consumer POD device 104 in which the package carrier 138 may scan with the carrier mobile computing device 146. Scanning of the QR code may provide a numeric code to unlock the electronic lock 502. Alternatively, the carrier mobile computing device 146 may take an image of the QR code.

At operation 910, the package carrier 138 may enter the access code into the electronic lock 502. For example, the package carrier may reproduce the imaged QR code received from the consumer POD device 104 by placing it in the field of view of the camera 506 of the electronic lock 502. Upon scanning the QR code with the camera 506, the electronic lock 502 may actuate to allow entry by the package carrier 138. In addition, the carrier mobile computing device 146 may be tapped against the NC reader 504 of the electronic lock to gain entry. For example, scanning the QR code on the display 220 of the consumer POD device 104 may provide an electronic access code to the carrier mobile computing device 146 that can be used to actuate the electronic lock 502. Moreover, the package carrier 138 may simply enter the numeric access code into the electronic lock 502 via the numeric keypad 508. At operation 912, upon entering the access code, the package carrier 138 may gain access to the consumer's selected delivery location (e.g., home, place of business, storage unit, etc.) by actuating the electronic lock via the access code.

After gaining access, the package carrier 138 may leave the package and no longer access the delivery location (e.g., consumer's home, place of business, storage unit, etc.). At operation 914, the electronic lock 502 may actuate and lock the access point to the consumer's delivery location based on proximity of the carrier mobile computing device 146. For example, as described herein, a location of the carrier mobile computing device 146 may be obtained via a location service (e.g., global positioning system (GPS) service) in the carrier mobile computing device 146. In addition, as described above, the carrier mobile device ID 132 is transmitted by the carrier mobile computing device 146 to the consumer POD device 104 upon connection. The consumer POD device 104 may use the carrier mobile device ID 132 and a location service of the carrier mobile computing device 146 to obtain a location of the carrier mobile computing device 146. When the package carrier 138 leaves the location of the consumer POD device 104, for example, travels beyond a threshold distance from the consumer POD device 104, the consumer POD device 104 may transmit a "lock" command to the electronic lock 502 via the network 114, thereby securing the access point to the consumer's delivery location. In a preferred embodiment, the threshold distance is about 5 meters (m) (16.4 feet (ft.)). In some embodiments, the threshold distance may be adjusted by the consumer via the consumer POD device 104 and/or the consumer computing device 102.

Any actions, functions, operations, and the like recited herein may be performed in the order shown in the figures and/or described above or may be performed in a different order. Furthermore, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed, and substitutions made herein without departing from the scope of the invention as recited in the claims.

Having thus described one or more embodiments of the invention, what is claimed as new and desired to be protected by Letters Patent includes the following:

What is claimed is:

1. A computer-implemented electronic transaction method via a payment-on-delivery device comprising a camera, a motion sensor, and a processor, the method comprising the operations of:
   detecting, by the processor using the motion sensor, the presence of the package carrier, wherein the package carrier has a package and a machine-readable transaction code;
   reading, by the processor using the camera, the machine-readable transaction code;
   extracting, by the processor, transaction details from the machine-readable transaction code, the transaction details being associated with a collect-on-delivery transaction and including an electronic record of the collect-on-delivery transaction;
   transmitting a notification, by the processor, to a consumer computing device;
   receiving, by the processor from the consumer computing device, an acknowledgement of receipt of the notification;
   transmitting, by the processor, the transaction details to the consumer computing device;
   receiving, by the processor from the consumer computing device, payment details;
   generating, by the processor, a payment authorization request message using the payment details received from the consumer computing device;
   transmitting, by the processor, the payment authorization request message to an interchange network;
   receiving, by the processor, a payment authorization response message from the interchange network;
   transmitting to a carrier mobile computing device, by the processor, a first payment completion message; and
   transmitting to the consumer computing device, by the processor, a second payment completion message.

2. The method in accordance with claim 1, wherein the transaction details include a transaction number and one or more of the following: information relating to the consumer, a delivery address, a delivery date, an estimated delivery date, a total payment amount due upon delivery, purchased products, and quantities of purchased products.

3. The method in accordance with claim 1, wherein reading the machine-readable transaction code comprises reading, by the processor using the camera, the machine-readable transaction code printed on the package.

4. The method in accordance with claim 1, wherein reading the machine-readable transaction code comprises reading, by the processor using the camera, the machine-readable transaction code displayed to the payment-on-delivery device via the carrier mobile computing device.

5. The method in accordance with claim 1, wherein the payment details comprises digital wallet data.

6. A payment-on-delivery device comprising:
   a camera;
   a motion sensor;
   one or more wireless communication modules;
   a processor; and
   a memory device storing executable instructions that when executed by the processor cause the processor to perform the operations of:
      detecting the presence of a package carrier via said motion sensor, the package carrier having a package and a machine-readable transaction code;
      reading, via the camera, the machine-readable transaction code;
      extracting transaction details from the machine-readable transaction code, the transaction details being associated with a collect-on-delivery transaction and including an electronic record of the collect-on-delivery transaction;
      transmitting a notification, via the one or more wireless communication modules, to a consumer computing device;
      receiving, by one or more wireless communication modules from the consumer computing device, an acknowledgement of receipt of the notification;
      transmitting the transaction details to the consumer computing device;
      receiving from the consumer computing device, via the one or more wireless communication modules, payment details;
      generating a payment authorization request message using the payment details received from the consumer computing device;
      transmitting the payment authorization request message, via the one or more wireless communication modules, to an interchange network;
      receiving, via the one or more wireless communication modules, a payment authorization response message from the interchange network;
      transmitting to a carrier mobile computing device, via the one or more wireless communication modules, a first payment completion message; and
      transmitting to the consumer computing device, via the one or more wireless communication modules, a second payment completion message.

7. The payment-on-delivery device in accordance with claim 6,
   wherein the transaction details include a transaction number and one or more of the following: information relating to the consumer, a delivery address, a delivery date, an estimated delivery date, a total payment amount due upon delivery, purchased products, and quantities of purchased products.

8. The payment-on-delivery device in accordance with claim 6, wherein reading the machine-readable transaction code comprises reading the machine-readable transaction code printed on the package.

9. The payment-on-delivery device in accordance with claim 6, wherein reading the machine-readable transaction code comprises reading the machine-readable transaction code displayed to said payment-on-delivery device via the carrier mobile computing device.

10. The payment-on-delivery device in accordance with claim 6, wherein the payment details comprises digital wallet data.

* * * * *